J. J. WEIER.
DETACHABLE MOTOR TRUCK CRAWLER.
APPLICATION FILED NOV. 25, 1918.
1,383,356.
Patented July 5, 1921.
4 SHEETS—SHEET 1.
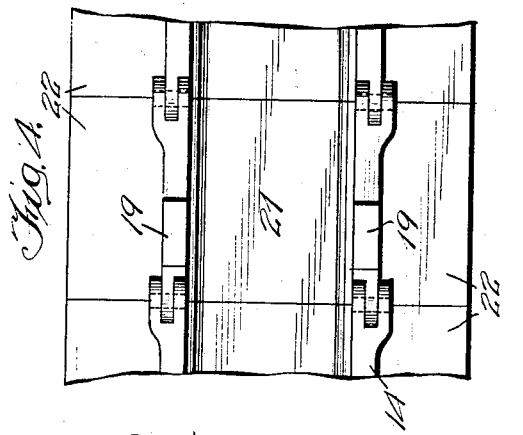
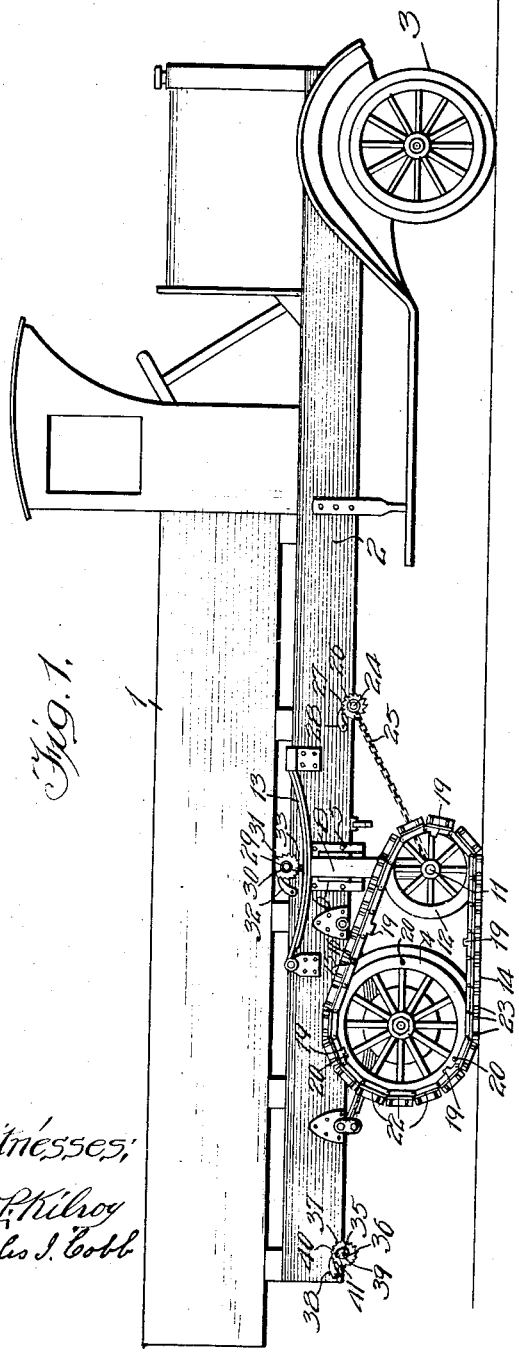
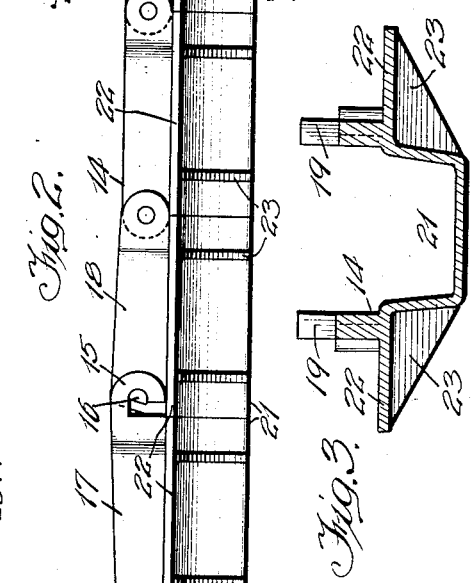

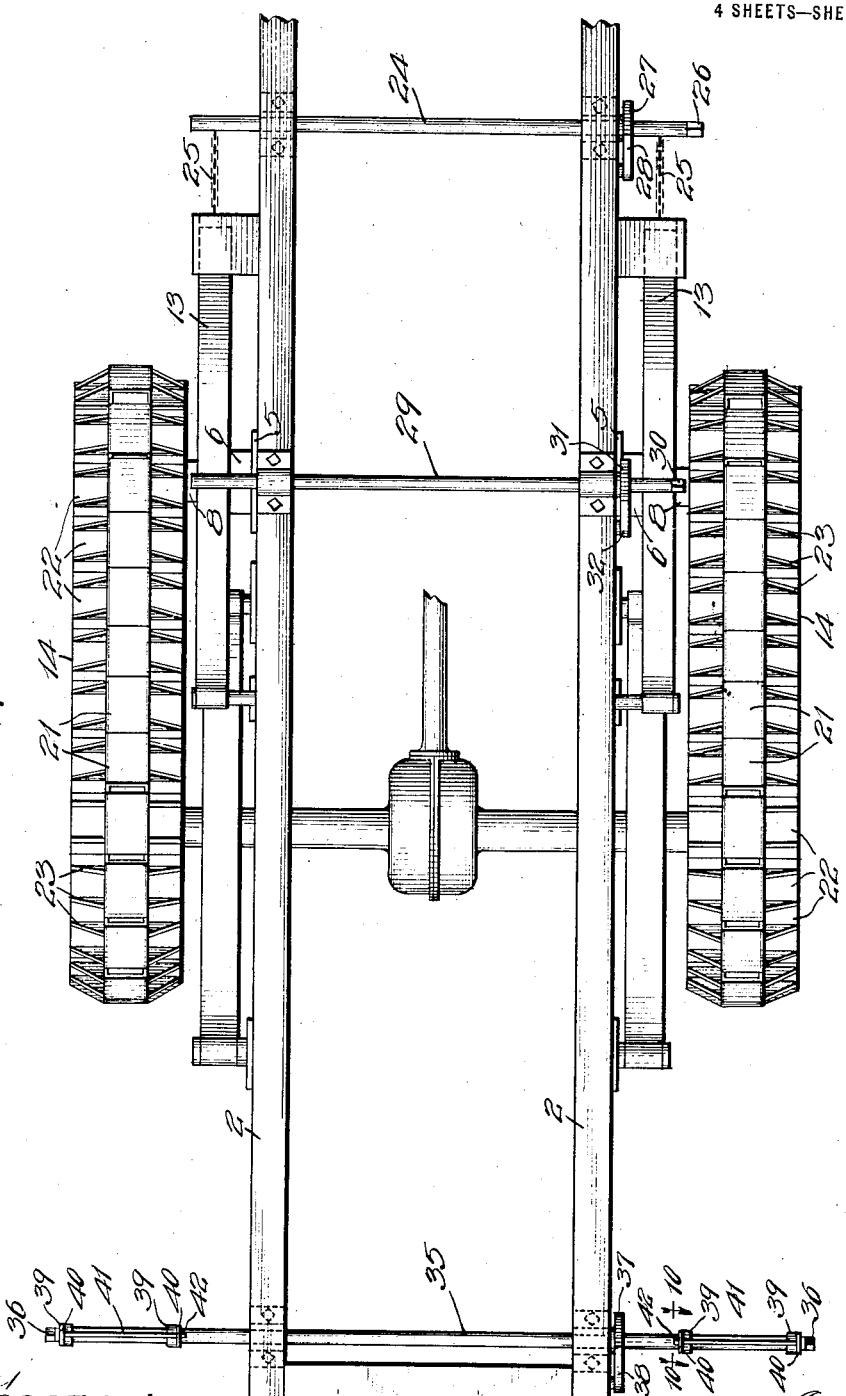

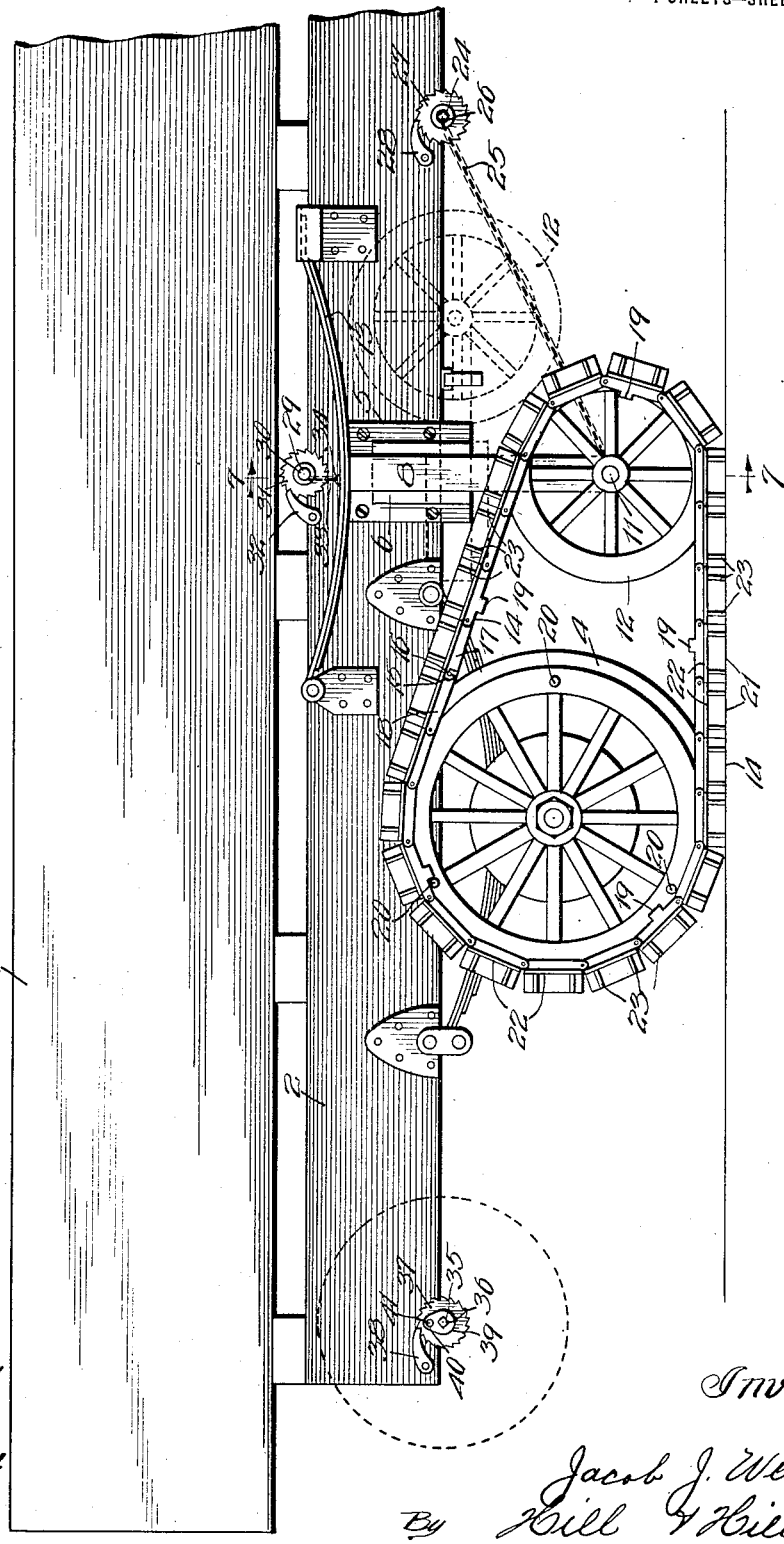

J. J. WEIER.
DETACHABLE MOTOR TRUCK CRAWLER.
APPLICATION FILED NOV. 25, 1918.
1,383,356.
Patented July 5, 1921.
4 SHEETS—SHEET 4.
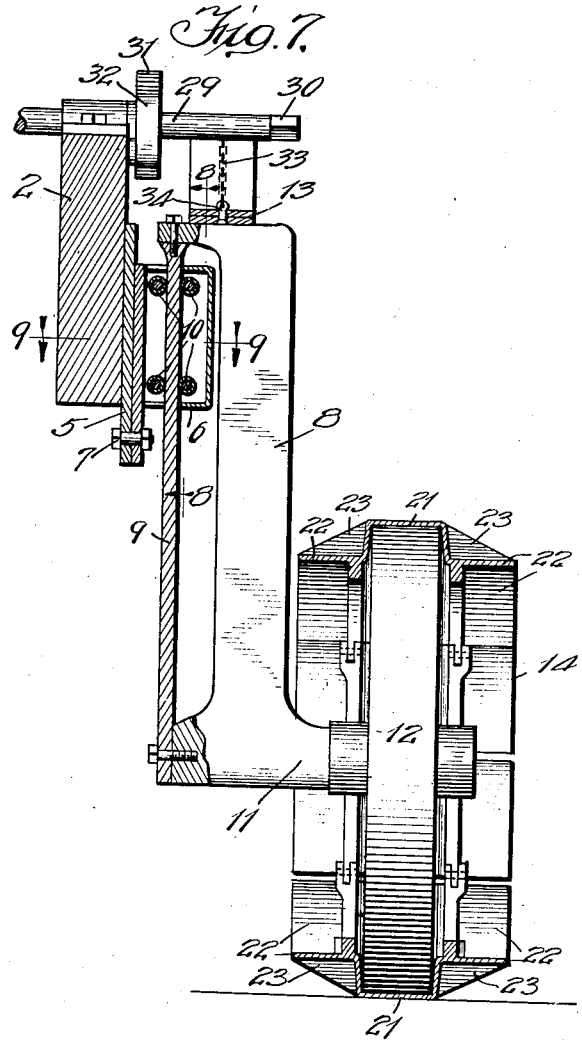
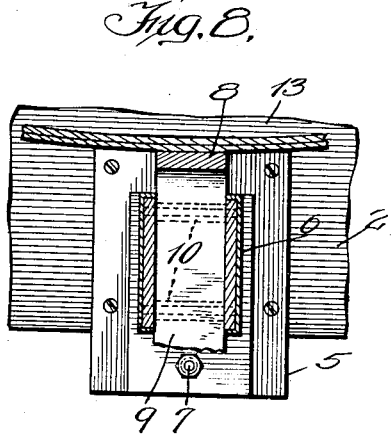
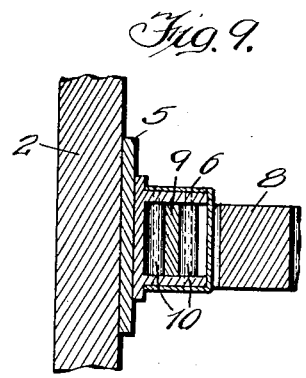
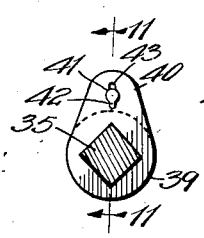
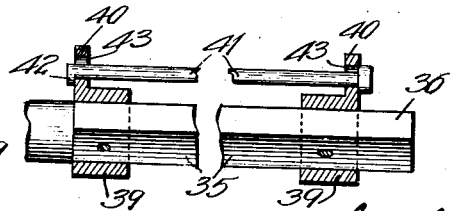

UNITED STATES PATENT OFFICE.

JACOB J. WEIER, OF CHICAGO, ILLINOIS, ASSIGNOR OF ONE-THIRD TO FRANK J. HEITMANN AND ONE-THIRD TO WILLIAM A. KLATTE, BOTH OF CHICAGO, ILLINOIS.

DETACHABLE MOTOR-TRUCK CRAWLER.

1,383,356. Specification of Letters Patent. Patented July 5, 1921.

Application filed November 25, 1918. Serial No. 264,043.

*To all whom it may concern:*

Be it known that I, JACOB J. WEIER, a citizen of the United States, residing at Chicago, in the county of Cook and State of Illinois, have invented certain new and useful Improvements in Detachable Motor-Truck Crawlers, of which the following is a description.

My invention broadly belongs to the tractor type of devices in that it embraces the well known self laying traction track type of mechanism for securing traction upon the road. It is particularly adapted for use upon trucks and devices of that character as hereafter pointed out.

It has for its object the construction of a self. laying traction track mechanism which may be readily adapted and applied to a truck as desired, and when the nature of the roads is such that it is not required, may be rendered inoperative and the truck employed in the usual manner. To this end it consists in the novel construction, arrangement and combination of parts herein shown and described, and more particularly pointed out in the claims.

In the drawings, wherein like reference characters indicate like or corresponding parts—

Figure 1 is a side elevation of a truck operatively equipped with my improvement;

Fig. 2 is a fragmentary view of the self laying traction chain or track, showing its construction and the method or means by which it is flexibly connected together;

Fig. 3 is a view taken substantially on line 3—3 of Fig. 2;

Fig. 4 is a top plan view of a fragment of the caterpillar track;

Fig. 5 is a top plan view of the rear end of a truck equipped with my improvement;

Fig. 6 is a side elevation of a rear part of the truck substantially as shown in Fig. 1, but enlarged to more clearly show the construction;

Fig. 7 is a partial sectional view taken on line 7—7 of Fig. 6;

Fig. 8 is a sectional view taken on line 8—8 of Fig. 7;

Fig. 9 is a section taken on line 9—9 of Fig. 7;

Fig. 10 is a cross sectional view taken on line 10—10 of Fig. 5; and

Fig. 11 is a view taken on line 11—11 of Fig. 10.

In the drawings, 1 is a truck of well known construction provided with suitable chassis, of which the side sills 2 form a part. 3 and 4 are the ordinary wheels of such a truck, which need not be further described.

Referring particularly to Figs. 1, 6 and 7, it will be seen that a plate 5 is firmly secured to the sill 2 on each side of the truck, and carries a frame 6 which is pivotally secured thereto as at 7. A standard 8 of suitable material is provided with a guiding portion 9 firmly secured thereto which extends through the frame 6, preferably between rollers 10, permitting a free vertical or endwise movement of the standard 8. The lower part of the standard 8 is provided with a stub shaft 11, upon which is mounted a wheel 12, the same in each case being arranged in alinement with the rear wheel 4 of the truck. Arranged above the standard 8 is provided suitable spring or resilient means 13 carried on the chassis, resiliently holding the wheel 12 down in contact with the roadway, but permitting the latter to rise to accommodate itself to any unevenness of the road. Some such provision is necessary in view of the fact that when the wheel 12 is in operative use there are three points bearing upon the road.

A linked belt track 14 is constructed to inclose the two wheels 4 and 12, in a manner that when the wheel 4 is driven, it will serve to lay down the track between the two wheels, with which track the rear wheel engages. Any preferred type of track that will accomplish the purpose may be employed for this purpose. In the preferred form, which I have illustrated and which is clearly shown in the drawings, the several sections are pivotally connected together in any preferred manner, the connecting ends being preferably hooked as shown at 15—16, in which the hook on the link 17 engages the stud 16 on the approximate link 18. This detachably connects the two so that the chain may be readily removed or mounted, as desired. At suitable intervals about the chain, I prefer to provide extensions 19 or equivalent means, the same being so positioned as to be engaged by coöperating pins 20 or equivalent parts on the wheel 4. This insures a positive engagement of the wheel with the chain, and the reliable operation of the device. With such construction or equivalent means, the wheel 4 cannot slip in the chain or track. In the preferred form shown in Figs. 3 and 4, I prefer that the links of the track or chain shall be dish shaped or recessed, as at 21, for the reception of the periphery of the wheels. The link also is provided with lateral extensions 22, and for the purposes of strength and to secure a more reliable engagement in sandy, soft or muddy ground, I prefer to provide transverse fins or braces 23. When the chain is mounted as illustrated, suitable means are provided to so hold the wheels 4 and 12 as to maintain the chain in operative position, that is, substantially tight, so that the chain may not accidentally disengage therefrom. In the preferred form illustrated, I accomplish this by extending a shaft 24 across the chassis and connecting the shaft 11 of the wheel 12 to said shaft 24 by means of a chain 25. The end of the shaft 24 may be squared or otherwise formed to receive a suitable handle, as at 26, and a rachet 27 and a coöperating pawl 28 may be provided to hold the shaft in the desired position, as it is rotated.

A similar shaft 29 (Figs. 1, 5, 6 and 7) is carried by the chassis, provided with a squared end 30 for the reception of a handle, and a rachet 31 and coöperating pawl 32 therefor. A chain 33 is connected to the shaft 29 with the free end connected to the spring 13 at 34, as clearly shown in Fig. 7. By rotating this shaft the spring may be raised to release the end of the standard 8, so that if otherwise freed from the chain 14, the standard 8 may be rotated or pivoted on the pivot 7, raising the wheel 12 substantially to the position shown in dotted lines in Fig. 6, at which point it may be secured to and carried on the chassis until such time as it becomes necessary to again employ it in putting the self laying traction track in operative position. Referring to Figs. 5, 10 and 11, a third shaft 35 may be carried by the chassis if desired, provided with a squared end 36, a rachet 37 and pawl 38. This shaft may be divided at its end, which preferably extends outwardly from the chassis, means for engaging the chain 14 permitting the latter to be wrapped thereon and carrying the chain or track thereon when it is not in use for traction purposes. The means for engaging the chain or track with the shaft may be of any preferred type. As shown in the drawings, I prefer to construct this portion of the device with collars 39 firmly secured to the shaft 35, said collars being provided with extensions 40 through which a rod 41 loosely passes. As shown, the end of the rod 41 is provided with a laterally extending shoulder 42, which when the rod is passed through the enlarged openings 43, engages with the outer wall of the inner sleeve, that is, the one nearest the chassis. The hooks 15 (Fig. 2) readily engage the rod 41, when by rotating the shaft 35 the track chain 14 will be wrapped around the shaft and secured thereto, providing a convenient means for carrying the chain and always having it in readiness for use. When it is desired to release the chain, the rod 41 may be rotated to bring the transverse end 42 in alinement with the holes 43, when the rod may be readily withdrawn, and with the end of the chain placed on the ground in the rear of the wheel 4, the wheel may be readily backed into it together with the wheel 12. The chain 25 is released so that the wheel 12 may be swung backward, permitting the hook 15 to engage the stud 16 on both sides of the chain. When this is done the chain 25 is again tightened to a suitable point, and the chain 33 released, allowing the spring 13 to operatively engage the top of the standard 8.

The entire device is simple in construction and very effective in operation. The parts may be very readily and easily assembled in operative position, or as readily disengaged, so that the truck may be used in the ordinary manner. In practice I have found the device particularly effective in sandy or muddy ground, or in any place where the rear wheel is likely to slip in the ordinary use.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a device of the kind described, a vehicle provided with driving wheels, in combination with auxiliary wheels carried by the vehicle in alinement with the driving wheels, said auxiliary wheels each being mounted upon a vertically movable standard pivotally connected to its coöperating parts, said pivotal axes being parallel to the journal axes of said auxiliary wheels, and means for swinging the auxiliary wheels on their pivoted support upward out of engagement with the road bed, or permitting them to extend vertically downward to contact therewith.

2. An auxiliary wheel for vehicles comprising a plate adapted to be secured to the frame of the vehicle, a supporting and guiding frame pivotally secured to said plate, in combination with a standard sustained and guided in the frame, anti-friction guiding means in said guiding frame and bearing on said standard, said standard provided with a transverse shaft, and a wheel rotatably mounted on the shaft.

3. In a device of the kind described, a vehicle provided with driving wheels on each side, plates secured to the body of the vehicle, and a supporting and guiding frame pivotally secured to each of the plates, in combination with a standard supported and guided in each of said plates, adjustable resilient means arranged to press said standards downward, transverse shafts carried by the standards, rotatable wheels carried on the shafts, and a tractor chain carried by and connecting each driving wheel with an auxiliary wheel.

4. In a device of the kind described, a vehicle provided with driving wheels, in combination with auxiliary wheels carried by the vehicle in alinement with the driving wheels, said auxiliary wheels each being mounted upon a vertically movable standard pivotally connected to its coöperating parts, a traction chain mounted upon and connecting the wheels on each side, means for pivotally swinging the auxiliary wheels transversely of their journal axes upwardly out of engagement with the road bed, and means for increasing the distance between the two coöperating wheels to tighten the traction chain.

5. In a device of the kind described, a vehicle provided with a vehicle wheels on each side, plates secured to the body of the vehicle, and a supporting and guiding frame pivotally secured to each of the plates, in combination with a standard supported and guided in each of said plates, resilient means arranged to press said standards downward, shafts carried by the standards, rotatable wheels carried on said shafts, a tractor chain carried by and connecting each driving wheel and auxiliary wheel, and means for varying the distance between each driving and auxiliary wheel.

In testimony whereof, I have hereunto signed my name in the presence of two subscribing witnesses.

JACOB J. WEIER.

Witnesses:
H. MORRIS,
JACOB KOLLS.